D. F. MAHER.
HAND GRIP PAD FOR STEERING WHEELS AND THE LIKE.
APPLICATION FILED AUG. 18, 1915.

1,190,781. Patented July 11, 1916.

INVENTOR
DAVID F. MAHER
BY
ATT'Y

UNITED STATES PATENT OFFICE.

DAVID F. MAHER, OF WATSONVILLE, CALIFORNIA.

HAND-GRIP PAD FOR STEERING-WHEELS AND THE LIKE.

1,190,781.  Specification of Letters Patent.  Patented July 11, 1916.

Application filed August 18, 1915. Serial No. 46,083.

*To all whom it may concern:*

Be it known that I, DAVID F. MAHER, a citizen of the United States, residing at Watsonville, in the county of Santa Cruz and State of California, have invented new and useful Improvements in Hand-Grip Pads for Steering-Wheels and the like, of which the following is a specification.

A certain amount of the fatigue in driving a motor car is caused by the vibration from the engines and from encountering inequalities in the surface of the road being transmitted to the hands of the driver from being in contact with the steering wheel of the car. No effective means have been heretofore provided, so far as I am aware, to reduce or eliminate this vibration, because it is considered of vital importance that the driver should retain a firm grip upon the steering wheel, and also should be able to readily shift the position of his hands with reference to said wheel, and the ordinary means for absorbing shock and vibration do not permit this to be done, or are inapplicable to the steering wheel of a car as being expensive, cumbersome, or conspicuous in appearance.

The object of the present invention is to provide means whereby shocks and vibrations will be no longer imparted to the hands of the driver through the steering wheel, and which will yet permit the driver to retain a very firm hold upon the steering wheel, and to shift the position of his hands in regard to said steering wheel.

Figure 1:
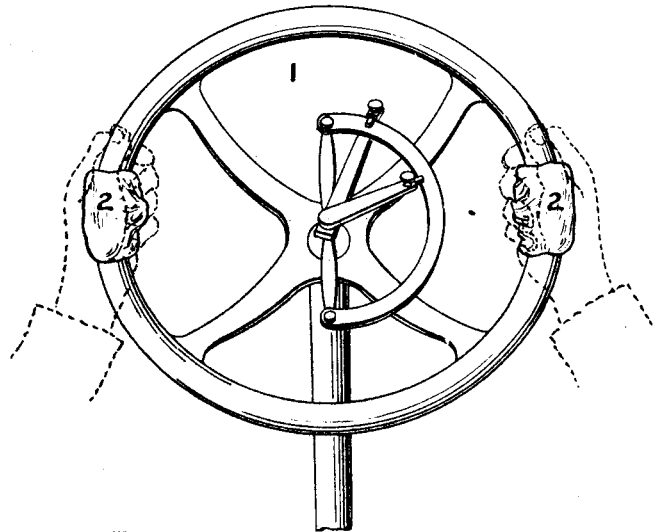
Figure 2:
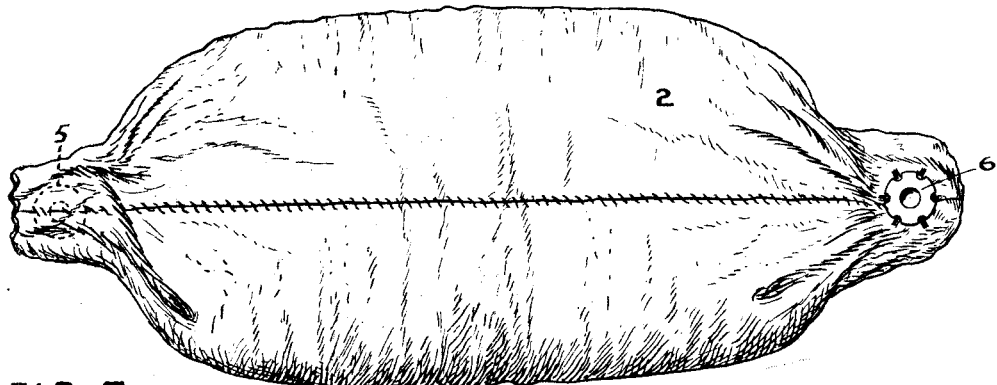
Figure 3:
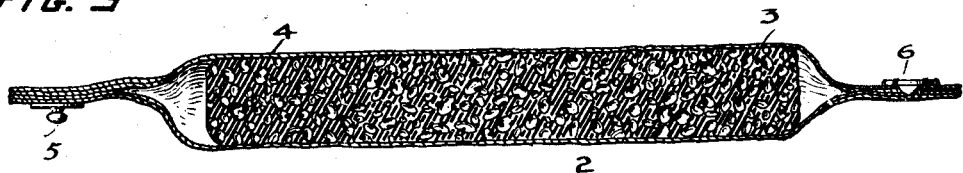

In the accompanying drawing, Figure 1 is a perspective view of a steering wheel of a motor car to which my invention is applied; Fig. 2 is an enlarged similar view of the invention detached from the steering wheel; Fig. 3 is a cross section of the same.

Referring to the drawing, 1 indicates a steering wheel of a motor car, and 2 indicates my improved device for absorbing shock and vibration transmitted from said steering wheel. In the preferred form of my invention it comprises a pad, piece or block 3 of molded porous or spongy rubber or similar elastic substance, entirely inclosed within a covering 4 of chamois skin, sheep skin, rubber, velvet, leather, cloth, or other suitable covering material. The pad or block is of an oblong form with rounded ends, and of a length suitable to more than half encircle in a transverse direction the ring of wood or other material of which the steering wheel is principally formed. The ends of the covering of chamois skin or other material are extended longitudinally and contracted transversely, and on the outer side of one end and on the inner side of the other end are secured spring clamp members 5, 6, by which the two ends may be conveniently fastened together around said wooden ring. The dimensions of the parts are such that the pad can readily be slid along the steering wheel when the rubber pad is not compressed. At the same time, owing to the pad of spongy rubber being extremely compressible and elastic, the device, when gripped by the hand can be caused to firmly grip the wooden ring, so that there is no possibility of slippage thereon.

It is found that, with a device of this kind, the jars and vibrations of the steering wheel are almost entirely absorbed by the pad and are not transmitted to the hand of the driver. Especially is this the case when the driver is not grasping the steering wheel very tightly as when turning the car from its direct course.

It will be seen that by means of this contrivance I avoid the fatigue hereinbefore referred to occasioned by driving a motor car. The fatigue after driving a car five or ten miles affects the hands of the driver so as to produce an uncomfortable shaking or trembling feeling therein.

It is obvious that my invention is not limited to its use in motor cars but may also be used with any device which is necessary to hold with the hands and which is subjected to constant vibration such as that from an engine, and the claims are to be read with this significance.

I claim:—

1. In a device of the character described, a pad of spongy rubber and of a length and width to surround as much of the ring portion of the steering wheel of a self-propelled vehicle as is necessary to protect the hand of the driver grasping said steering wheel from direct contact therewith, a flexible covering inclosing said pad, and means for detachably securing the ends of said covering together.

2. In a device of the character described, a pad of spongy rubber and of a length and width to surround as much of the ring portion of the steering wheel of a self-propelled vehicle as is necessary to protect the hand of the driver grasping said steering wheel from direct contact therewith, a flexible covering inclosing said pad having ends reduced in width and spring clasp members secured on the respective ends.

In testimony whereof I have hereunto set my hand in the presence of two subscribing witnesses.

DAVID F. MAHER.

Witnesses:
G. M. BALL,
D. B. RICHARDS.